US010827463B2

(12) United States Patent
Zhao et al.

(10) Patent No.: US 10,827,463 B2
(45) Date of Patent: Nov. 3, 2020

(54) SYSTEM MESSAGE TRANSMISSION METHOD, TRANSMISSION DEVICE, RECEPTION METHOD, RECEPTION DEVICE AND STORAGE MEDIUM

(71) Applicant: CHINA ACADEMY OF TELECOMMUNICATIONS TECHNOLOGY, Beijing (CN)

(72) Inventors: Yali Zhao, Beijing (CN); Pierre Bertrand, Beijing (CN); Chandrika Kumudinie Worrall, Beijing (CN); Li Chen, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 0 days.

(21) Appl. No.: 16/301,145

(22) PCT Filed: Apr. 19, 2017

(86) PCT No.: PCT/CN2017/081006
§ 371 (c)(1),
(2) Date: Nov. 13, 2018

(87) PCT Pub. No.: WO2017/193774
PCT Pub. Date: Nov. 16, 2017

(65) Prior Publication Data
US 2019/0297597 A1  Sep. 26, 2019

(30) Foreign Application Priority Data
May 13, 2016 (CN) .......................... 2016 1 0320320

(51) Int. Cl.
*H04W 72/00* (2009.01)
*H04L 1/00* (2006.01)
(Continued)

(52) U.S. Cl.
CPC ............. *H04W 72/005* (2013.01); *H04L 1/00* (2013.01); *H04L 1/0038* (2013.01); *H04W 4/06* (2013.01);
(Continued)

(58) Field of Classification Search
CPC .......... H04W 4/06; H04W 4/12; H04W 4/20; H04W 4/21; H04W 4/23; H04W 72/005;
(Continued)

(56) References Cited

U.S. PATENT DOCUMENTS

2010/0278093 A1    11/2010  Wang et al.
2013/0258938 A1*   10/2013  Sagfors ................. H04W 72/02
                                                          370/312
(Continued)

FOREIGN PATENT DOCUMENTS

CN      101128031 A     2/2008
CN      103534970 A     1/2014
(Continued)

OTHER PUBLICATIONS

Extended European Search Report from EP app. No. 17795392.4, dated Apr. 15, 2019.
(Continued)

*Primary Examiner* — Pao Sinkantarakorn
(74) *Attorney, Agent, or Firm* — Ladas & Parry, LLP

(57) ABSTRACT

A system message transmission method, transmission device, reception method reception device and a storage medium are provided. The transmission method includes determining, by a network side device, sets to which each of system messages to be transmitted belongs, wherein the sets include a basic system message set and a specific system message set; determining, by the network side device, a transmission mode of each of the system messages, wherein the transmission mode of system messages in the basic
(Continued)

system message set is a broadcast transmission mode, and the transmission mode of system messages in the specific system message set includes a broadcast transmission mode and/or a demand-based dedicated signaling transmission mode.

15 Claims, 4 Drawing Sheets

(51) Int. Cl.
H04W 4/06 (2009.01)
H04W 4/12 (2009.01)
H04W 4/20 (2018.01)
H04W 36/08 (2009.01)

(52) U.S. Cl.
CPC ............ *H04W 4/12* (2013.01); *H04W 4/20* (2013.01); *H04W 36/08* (2013.01)

(58) Field of Classification Search
CPC .... H04W 72/1289; H04L 1/00; H04L 1/0038; H04L 5/0091–0098
See application file for complete search history.

(56) References Cited

U.S. PATENT DOCUMENTS

2015/0181575 A1* 6/2015 Ng .................. H04L 5/0092
370/329
2017/0311285 A1* 10/2017 Ly .................. H04W 72/005

FOREIGN PATENT DOCUMENTS

| CN | 103716138 A | 4/2014 |
| CN | 103856923 A | 6/2014 |
| EP | 2897416 A2 | 7/2015 |
| WO | 2015066645 A1 | 5/2015 |

OTHER PUBLICATIONS

Written Opinion of the International Searching Authority from PCT/CN2017/081006, dated Jul. 13, 2017, with English translation from WIPO.
International Preliminary Report on Patentability from PCT/CN2017/081006, dated Nov. 13, 2018, with English translation from WIPO.
International Search Report for PCT/CN2017/081006 dated Jun. 19, 2017 and its English translation provided by WIPO.
Written Opinion of the International Search Authority PCT/CN2017/081006 dated Jun. 19, 2017 and its English translation provided by Google Translate.

* cited by examiner

US 10,827,463 B2

SYSTEM MESSAGE TRANSMISSION METHOD, TRANSMISSION DEVICE, RECEPTION METHOD, RECEPTION DEVICE AND STORAGE MEDIUM

CROSS-REFERENCE TO RELATED APPLICATIONS

The present application is a U.S. national phase application of PCT Application No. PCT/CN2017/081006 filed on Apr. 19, 2017, which claims a priority to a Chinese patent application No. 201610320320.4 filed in China on May 13, 2016, the disclosures of which are incorporated herein by reference in their entireties.

TECHNICAL FIELD

The present disclosure relates to a field of communication technology, and specifically relates to a system message transmission method, a system message transmission device, a system message reception method, a system message reception device, and a storage medium.

BACKGROUND

System messages refer to common messages in a cell. In a traditional cellular network, a user equipment (UE) acquires complete information of a cell by receiving the system messages. For purpose of ensuring successful reception of the system messages, the system messages always occupy a part of time-domain resources and frequency-domain resources in advance.

In a Long Term Evolution (LTE) system, systems messages in the LTE system mainly include a Master Information Block (MIB) and a plurality of System Information Blocks (SIB). When the UE accesses to a new cell or broadcast messages are changed, the UE may receive system messages (MIB/SIB). The system messages include MIB, SIB1, and SI (System Information). The SI includes SIB2 to SIB20 currently, and may be further expanded.

May restrictions and specifications are imposed on transmission of the system messages in the LTE system. With traffics of a wireless communication system being diversified and types of UEs being increased, contents of the system messages become more and more, and resources occupied by the system messages are increased. Accordingly, available resources for transmitting actual traffic data may be reduced. Furthermore, some specifications of the system messages also restrict application of other functions. For example, the MIB and the SIB1 occupy subframes 0 and 5 always. Thus, communication standards have to specify that a paging subframe, a MBSFN (Multicast/Broadcast Single Frequency Network) subframe cannot use the subframes 0 and 5. As another example, in an in-band relay, a transmission in an access link from a Relay Node (RN) to a UE can only use a MBSFN subframe in a backhaul link from a Donor eNB (DeNB) to the RN, in which case not only available resources are restricted, but also a transmission latency in the access link is increased. Therefore, optimization of a transmission scheme for the system messages is to be considered in a mobile communication system in future.

SUMMARY

In view of the above, a system message transmission method, a system message transmission device, a system message reception method, a system message reception device are provided in the present disclosure, so as to reduce resources overhead of system messages and enhance a resource utilization rate of an entirety of a system.

To solve the technical problems, a system message transmission method is provided in the present disclosure. The method includes determining, by a network side device, sets to which each of a plurality of system messages needing to be transmitted belongs, wherein the sets include a basic system message set and a specific system message set; determining, by the network side device, a transmission mode of the each of the plurality of system messages, wherein the transmission mode of all system messages in the basic system message set is a broadcast transmission mode, and the transmission mode of all system messages in the specific system message set includes at least one of: a broadcast transmission mode, or a demand-based dedicated signaling transmission mode; and transmitting the system messages by the network side device according to the determined transmission modes.

Optionally, the transmitting the system messages by the network side device according to the determined transmission mode, includes: determining, by the network side device, whether a request sent by a User Equipment (UE) for requesting the system message in the specific system message set is received or not; in case that the request is received, transmitting, by the network side device to the UE using the dedicated signaling transmission mode, the system message requested by the UE.

Optionally, before determining, by the network side device, the sets to which each of the plurality of system messages needing to be transmitted belongs, the method further includes: grouping, by the network side device, the plurality of system messages needing to be sent, into the basic system message set and the specific system message set, wherein contents of the system messages in the basic system message set include parameters necessary to be acquired by a UE when the UE performs an access procedure and/or parameters necessary to be acquired by a UE in an idle state when the UE in the idle state performs a cell selection/re-selection procedure; and the system messages in the specific system message set include any one or a combination of a system message related to capability of a UE, a system message related to traffic characteristic of a UE, or a system message related to mobility of a UE.

Optionally, contents of the system messages in the basic system message set include all or a part of parameters in a Main Information Block (MIB) and a System Information Block (SIB) 1 to a SIB 8 in a Long Term Evolution (LTE) system; contents of the system messages in the specific system message set include all or a part of parameters in a SIB 9 to a SIB 20 in the LTE system.

Optionally, the determining, by the network side device, the transmission mode of each of the plurality of system messages in the specific system message set, includes: determining, by the network side device, the transmission mode of each of the system messages in the specific system message set according to pre-configured system message transmission modes; or determining, by the network side device, the transmission mode of each of the system messages in the specific system message set according to auxiliary information reported by a UE.

Optionally, the auxiliary information includes identifiers of system messages being interested in by the UE or identifiers of system messages not being interested in by the UE in the specific system message set. The determining, by the network side device, the transmission mode of each of the system messages in the specific system message set according to the auxiliary information reported by the UE, includes: in case that a current transmission mode of a system message in the specific system message set is the broadcast transmission mode and a quantity of UEs reporting to be interested in the system message within a predetermined time duration is below a pre-determined threshold, changing the transmission mode of the system message to the dedicated signaling transmission mode; or in case that the current transmission mode of the system message in the specific system message set is the broadcast transmission mode and the quantity of UEs reporting to be interested in the system message within the predetermined time duration equals or is higher than the pre-determined threshold, maintaining the transmission mode of the system message as the broadcast transmission mode; or in case that the current transmission mode of the system message in the specific system message set is the dedicated signaling transmission mode and the quantity of UEs reporting to be interested in the system message within a predetermined time duration is below a pre-determined threshold, maintaining the transmission mode of the system message as the dedicated signaling transmission mode; or in case that the current transmission mode of the system message in the specific system message set is the dedicated signaling transmission mode and the quantity of UEs reporting to be interested in the system message within the predetermined time duration equals or is higher than the pre-determined threshold, changing the transmission mode of the system message to the broadcast transmission mode.

Optionally, after the determining, by the network side device, the transmission mode of each of the system messages in the specific system message set, the method further includes: send, by the network side device to a UE, a serial number or an identifier of a system message in the specific system message set to be transmitted using the broadcast transmission mode and/or the dedicated signaling transmission mode.

Optionally, the sending, by the network side device to the UE, the serial number or the identifier of the system message in the specific system message set to be transmitted using the broadcast transmission mode and/or the dedicated signaling transmission mode, includes: causing, by the network side device, a system message in the basic system message set to carry an indication of the transmission mode of the system message in the specific system message set; or causing, by the network side device, a broadcast message or a dedicated signaling newly introduced to carry the indication of the transmission mode of the system message in the specific system message set.

Optionally, causing, by the network side device, the system message in the basic system message set to carry the indication of the transmission mode of the system message in the specific system message set, includes: in case that the transmission mode of any of the system messages in the specific system message set is changed, informing the UE in a current basic broadcast message modification period by the network side device that the transmission mode of the system message in the specific system message set is to be changed, and/or informing the UE of the identifier of the system message, the transmission mode of which is to be changed; and transmitting, by the network side device, the system message according to the changed transmission mode of the system message in a basic system message modification period following the current basic system message modification period.

Optionally, the causing, by the network side device, the broadcast message newly introduced to carry the indication of the transmission mode of the system message in the specific system message set, includes: in case that the transmission mode of any of the system messages in the specific system message set is changed, informing the UE in a current broadcast message modification period by the network side device that the transmission mode of the system message in the specific system message set is to be changed, and/or informing the UE of the identifier of the system message, the transmission mode of which is to be changed; and transmitting, by the network side device, the system message according to the changed transmission mode of the system message in a broadcast message modification period following the current broadcast message modification period.

Optionally, a broadcast process for the system messages in the basic system message set and a broadcast process for the system messages in the specific system message set are same, or are independent processes.

Optionally, the system message transmitted by the network side device includes: contents of the system message; or an identifier or a serial number of the system message.

Optionally, the transmitting the system messages by the network side device according to the determined transmission mode, includes: determining, by the network side device, whether a User Equipment (UE) is configured with the contents of the system message and the identifier or the serial number of the system message; if the UE is configured with the contents of the system message and the identifier or the serial number of the system message, transmitting the identifier or the serial number of the system message when the network side device transmits the system message; if the UE is not configured with the contents of the system message, transmitting the contents of the system message by the network side device.

A system message transmission device is further provided in the present disclosure and includes a set determination module configured to determine sets to which each of a plurality of system messages needing to be transmitted belongs, wherein the sets include a basic system message set and a specific system message set; a transmission mode determination mode configured to determine a transmission mode of the each of the plurality of system messages, wherein the transmission mode of all system messages in the basic system message set is a broadcast transmission mode, and the transmission mode of all system messages in the specific system message set includes at least one of: a broadcast transmission mode, or a dedicated signaling transmission mode based on requirements; and a transmission module configured to transmitting the system messages according to the determined transmission modes.

Optionally, the transmission module includes a determination submodule, the determination submodule is configured to: determine whether a request sent by a User Equipment (UE) for requesting the system message in the specific system message set is received or not; in case that the request is received, transmit, to the UE using the dedicated signaling transmission mode, the system message requested by the UE.

Optionally, the device further includes a grouping module configured to group the plurality of system messages needing to be sent, into the basic system message set and the specific system message set, wherein contents of the system messages in the basic system message set include parameters necessary to be acquired by a User Equipment (UE) when the UE performs an access procedure and/or parameters necessary to be acquired by a UE in an idle state when the UE in the idle state performs a cell selection/re-selection procedure; and the system messages in the specific system message set include any one or a combination of a system message related to capability of a UE, a system message related to traffic characteristic of a UE, or a system message related to mobility of a UE.

Optionally, contents of the system messages in the basic system message set include all or a part of parameters in a Main Information Block (MIB) and a System Information Block (SIB) 1 to a SIB 8 in a Long Term Evolution (LTE) system; contents of the system messages in the specific system message set include all or a part of parameters in a SIB 9 to a SIB 20 in the LTE system.

Optionally, the transmission mode determination module includes: a first determination submodule configured to determine the transmission mode of each of the system messages in the specific system message set according to pre-configured system message transmission modes; or a second determination submodule configured to determine the transmission mode of each of the system messages in the specific system message set according to auxiliary information reported by a User Equipment (UE).

Optionally, the second determination submodule includes a reception unit and a determination unit, the reception unit is configured to receive the auxiliary information reported by the UE, wherein the auxiliary information includes identifiers of system messages being interested in by the UE or identifiers of system messages not being interested in by the UE in the specific system message set; the determination unit configured to, in case that a current transmission mode of a system message in the specific system message set is the broadcast transmission mode and a quantity of UEs reporting to be interested in the system message within a predetermined time duration is below a pre-determined threshold, change the transmission mode of the system message to the dedicated signaling transmission mode; or in case that the current transmission mode of the system message in the specific system message set is the broadcast transmission mode and the quantity of UEs reporting to be interested in the system message within the predetermined time duration equals or is higher than the pre-determined threshold, maintain the transmission mode of the system message as the broadcast transmission mode; or in case that the current transmission mode of the system message in the specific system message set is the dedicated signaling transmission mode and the quantity of UEs reporting to be interested in the system message within a predetermined time duration is below a pre-determined threshold, maintain the transmission mode of the system message as the dedicated signaling transmission mode; or in case that the current transmission mode of the system message in the specific system message set is the dedicated signaling transmission mode and the quantity of UEs reporting to be interested in the system message within the predetermined time duration equals or is higher than the pre-determined threshold, change the transmission mode of the system message to the broadcast transmission mode.

Optionally, the device further includes a notification module configured to send, to a User Equipment (UE), a serial number or an identifier of a system message in the specific system message set to be transmitted using the broadcast transmission mode and/or the dedicated signaling transmission mode.

Optionally, the notification module includes: a first notification unit configured to cause a system message in the basic system message set to carry an indication of the transmission mode of the system message in the specific system message set; or a second notification unit configured to cause a broadcast message or a dedicated signaling newly introduced to carry the indication of the transmission mode of the system message in the specific system message set.

Optionally, the first notification unit is further configured to: in case that the transmission mode of any of the system messages in the specific system message set is changed, inform the UE in a current basic broadcast message modification period that the transmission mode of the system message in the specific system message set is to be changed, and/or inform the UE of the identifier of the system message, the transmission mode of which is to changed; and transmit the system message according to the changed transmission mode of the system message in a basic system message modification period following the current basic system message modification period.

Optionally, the second notification unit is further configured to: in case that the transmission mode of any of the system messages in the specific system message set is changed, inform the UE in a current broadcast message modification period that the transmission mode of the system message in the specific system message set is to be changed, and/or inform the UE of the identifier of the system message, the transmission mode of which is to be changed; and transmit the system message according to the changed transmission mode of the system message in a broadcast message modification period following the current broadcast message modification period.

Optionally, a broadcast process for the system messages in the basic system message set and a broadcast process for the system messages in the specific system message set are same, or are independent processes.

Optionally, the system message transmitted by the network side device includes: contents of the system message; or an identifier or a serial number of the system message.

Optionally, the transmission module includes a determination submodule, the determination submodule is configured to determine whether a User Equipment (UE) is configured with contents of the system message and an identifier or a serial number of the system message; if the determination submodule determines that the UE is configured with contents of the system message, the transmission module transmits the identifier or the serial number of the system message when the transmission module transmits the system message; if the determination submodule determines that the UE is not configured with contents of the system message, the transmission module transmits contents of the system message.

A system message reception method is further provided in the present disclosure and includes acquiring, by a User Equipment (UE), a transmission mode of each of a plurality of system messages, wherein the transmission mode of all system messages in the basic system message set is a broadcast transmission mode, and the transmission mode of all system messages in a specific system message set is at least one of: a broadcast transmission mode, or a dedicated signaling transmission mode based on requirements; and receiving the each of the plurality of system messages by the UE according to the transmission mode of the each of the plurality of system messages.

Optionally, in case that the UE is in an idle state, receiving the each of the plurality of system messages by the UE according to the transmission mode of the each of the plurality of system messages, includes: receiving only the system messages in the basic system message set by the UE.

Optionally, in case that the UE is in a connected state, receiving the each of the plurality of system messages by the UE according to the transmission mode of the each of the plurality of system messages, includes: receiving, by the UE through the broadcast transmission mode, system messages in the basic system message set transmitted by the network side device; in case that a transmission mode of a system message in the specific system message set is the broadcast transmission mode, receiving the system message in the specific system message set through the broadcast transmission mode by the UE; and in case that the transmission mode of the system message in the specific system message set is the dedicated signaling transmission mode and the UE is interested in the system message, requesting the system message from the network side device by the UE.

Optionally, the method further includes determining used resources according to a design of a physical layer of the UE when the UE receives the system message transmitted by a network side device through the broadcast transmission mode, wherein when the physical layer is designed to use static resources, the UE receives the system message using the static resources; when the physical layer is designed to use dynamic or semi-static physical resources, the UE acquires the system message through a blind detection procedure.

Optionally, before acquiring, by the UE, the transmission mode of each of the plurality of system messages, the method further includes: receiving, by the UE, an indication of a transmission mode of a system message in the specific system message set sent from the network side device.

Optionally, a system message in the basic system message set is used by the network side device to carry the indication of the transmission mode of the system message in the specific system message set; and receiving, by the UE, the indication of the transmission mode of the system message in the specific system message set sent from the network side device, includes: receiving the system message in the basic system message set by the UE through the broadcast transmission mode, and acquiring the transmission mode of the system message in the specific system message set from the indication carried in the system message in the basic system message set.

A system message reception device is further provided in the present disclosure and includes an acquisition module configured to acquire a transmission mode of each of a plurality of system messages, wherein the transmission mode of all system messages in the basic system message set is a broadcast transmission mode, and the transmission mode of all system messages in a specific system message set is at least one of: a broadcast transmission mode, or a dedicated signaling transmission mode based on requirements; and a system message reception module configured to receive the each of the plurality of system messages by the UE according to the transmission mode of the each of the plurality of system messages.

Optionally, in case that the UE in an idle state, the system message reception module is configured to receive only the system messages in the basic system message set by the UE.

Optionally, in case that a User Equipment (UE) is in a connected state, the system message reception module includes: a first reception submodule configured to receive, through the broadcast transmission mode, system messages in the basic system message set transmitted by a network side device; a second reception submodule configured to, in case that a transmission mode of a system message in the specific system message set is the broadcast transmission mode, receive the system message in the specific system message set through the broadcast transmission mode; and a third reception submodule configured to, in case that the transmission mode of the system message in the specific system message set is the dedicated signaling transmission mode and the UE is interested in the system message, request the system message from the network side device.

Optionally, the system message reception module is specifically configured to determine used resources according to a design of a physical layer of a User Equipment (UE) when the UE receives the system message transmitted by a network side device through the broadcast transmission mode, wherein when the physical layer is designed to use static resources, the system message reception module is configured to receive the system message using the static resources; when the physical layer is designed to use dynamic or semi-static physical resources, the system message reception module is configured to acquire the system message through a blind detection procedure.

Optionally, the device further includes a transmission mode reception module configured to receive an indication of a transmission mode of a system message in the specific system message set sent from the network side device.

Optionally, a system message in the basic system message set is used by the network side device to carry the indication of the transmission mode of the system message in the specific system message set; and the transmission mode reception mode is configured to receive the system message in the basic system message set through the broadcast transmission mode, and acquire the transmission mode of the system message in the specific system message set from the indication carried in the system message in the basic system message set.

A system message transmission device is further provided in the present disclosure and includes a processor, and a transceiver connected with the processor and configured to transmit data and receive data under a control of the processor, wherein the processor is configured to perform following operations; determining sets to which each of a plurality of system messages needing to be transmitted belongs, wherein the sets include a basic system message set and a specific system message set; determining a transmission mode of the each of the plurality of system messages, wherein the transmission mode of all system messages in the basic system message set is a broadcast transmission mode, and the transmission mode of all system messages in the specific system message set includes at least one of: a broadcast transmission mode, or a dedicated signaling transmission mode based on requirements; and transmitting the system messages according to the determined transmission modes.

A system message reception device is further provided in the present disclosure, and includes a processor, and a transceiver connected with the processor and configured to transmit data and receive data under a control of the processor, wherein the processor is configured to perform following operations: acquiring a transmission mode of each of a plurality of system messages, wherein the transmission mode of all system messages in the basic system message set is a broadcast transmission mode, and the transmission mode of all system messages in a specific system message set is at least one of: a broadcast transmission mode, or a dedicated signaling transmission mode based on requirements; and receiving the each of the plurality of system messages according to the transmission mode of the each of the plurality of system messages.

A non-volatile computer storage medium is further provided in the present disclosure and includes computer readable instructions executable by a processor stored on the non-volatile computer storage medium, wherein, when the computer readable instructions are executed by the processor, the processor performs following operations: determining sets to which each of a plurality of system messages needing to be transmitted belongs, wherein the sets include a basic system message set and a specific system message set; determining a transmission mode of the each of the plurality of system messages, wherein the transmission mode of all system messages in the basic system message set is a broadcast transmission mode, and the transmission mode of all system messages in the specific system message set includes at least one of: a broadcast transmission mode, or a dedicated signaling transmission mode based on requirements; and transmitting the system messages according to the determined transmission modes.

A non-volatile computer storage medium is further provided in the present disclosure and includes computer readable instructions executable by a processor stored on the non-volatile computer storage medium, wherein, when the computer readable instructions are executed by the processor, the processor performs following operations: acquiring a transmission mode of each of a plurality of system messages, wherein the transmission mode of all system messages in the basic system message set is a broadcast transmission mode, and the transmission mode of all system messages in a specific system message set is at least one of: a broadcast transmission mode, or a dedicated signaling transmission mode based on requirements; and receiving the each of the plurality of system messages according to the transmission mode of the each of the plurality of system messages.

Technical solutions in the above have advantages as follow. The network side device may dynamically or semi-dynamically adjust a transmission mode of a system message in a specific system message set. Thus, a broadcast overhead of the entirety of the system may be reduced effectively, and the resource utilization rate of the entirety of the system may be increased.

DETAILED DESCRIPTION

Detailed description of the present disclosure will be given hereinafter in conjunction with drawings and embodiments of the present disclosure. The following embodiments are used to illustrate the present disclosure, but do not limit the scope of the present disclosure.

Figure 1:
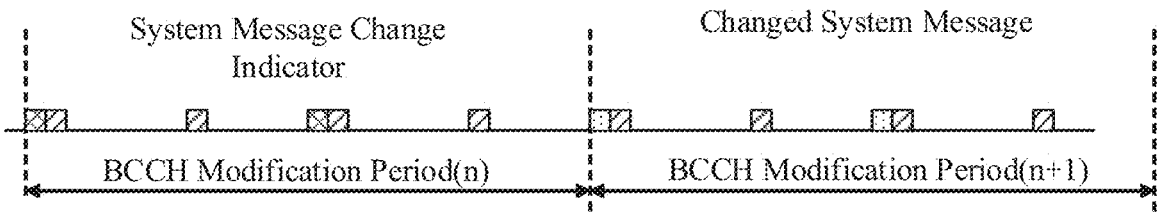
FIG. 1 is a schematic diagram of changing a system message in a relevant art.

FIG. 1 shows a system message transmission period and system message changes. Different blocks filled by different patterns represent different system messages. System message changes can only happen in specific wireless frames except several messages such as Earthquake and Tsunami Warning System (ETWS)/Commercial Mobile Alert System (CMAS), and may be determined by a Broadcast Control Channel (BCCH) modification period. In the modification period, a system message may be sent multiple times, and contents of the system message sent multiple times are the same.

The system message may only be changed after an edge of the modification period. When a base station needs to change a system message (all or a part of system messages), the base station needs to send a "system message change notification" to a User Equipment (UE) in a current modification period (BCCH modification period (n)), so as to inform the UE that system message changes are happen. The base station sends updated system messages (Updated information) in a next modification period (BCCH modification period (n+1).

Figure 2:
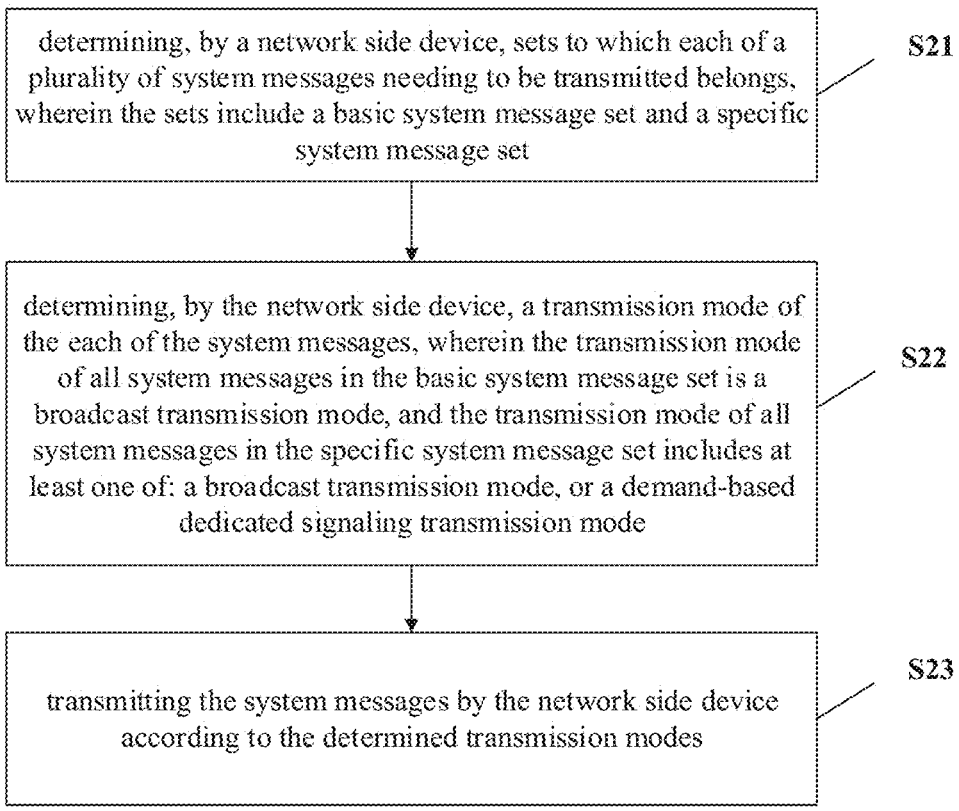
FIG. 2 is a flowchart of a system message transmission method according to some embodiments of the present disclosure.

Referring to FIG. 2, FIG. 2 is a flowchart of a system message transmission method according to some embodiments of the present disclosure. The system information transmission method includes steps 21-23.

Step S21: determining, by a network side device, sets to which each of a plurality of system messages needing to be transmitted belongs, wherein the sets include a basic system message set and a specific system message set;

Step S22: determining, by the network side device, a transmission mode of the each of the system messages, wherein the transmission mode of all system messages in the basic system message set is a broadcast transmission mode, and the transmission mode of all system messages in the specific system message set includes at least one of: a broadcast transmission mode, or a demand-based dedicated signaling transmission mode.

Step S23: transmitting the system messages by the network side device according to the determined transmission modes.

The dedicated signaling transmission mode based on requirements means that after the network side device receives a request sent by the UE for requesting a system message in the specific system message set, the network side device transmits, to the UE sending the request, the system message requested by the UE.

That is, the above step S23 may specifically include sub-steps 231-232 as follow.

Sub-step S231: determining, by the network side device, whether the request sent by the UE for requesting the system message in the specific system message set is received or not.

Sub-step S232: in case that the request is received, transmitting, by the network side device to the UE using the dedicated signaling transmission mode, the system message requested by the UE.

That is, the network side device may adjust the transmission mode for a system message in the specific system message set dynamically or semi-statically, so that broadcast overhead of an entirety of a system may be reduced effectively and an overall utilization of resources of the system may be increased.

In the above embodiments, before determining, by the network side device, the sets to which each of the system messages needing to be transmitted belongs, the method may further include grouping, by the network side device, the system messages needing to be sent, into the basic system message set and the specific system message set.

A rule for grouping the system messages into the system message sets may be that contents of system messages in the basic system message set include parameters necessary to be acquired by a UE when the UE performs an access procedure and/or parameters necessary to be acquired by a UE in an idle state when the UE performs a cell selection/re-selection procedure; and system messages in the specific system message set may be system messages other than those in the basic system message set. For example, the system messages in the specific system message set may include any one or a combination of a system message related to capability of a UE, a system message related to traffic characteristic of a UE, or a system message related to mobility of a UE.

Of course, with development of requirements, the system messages in the basic system message set and the specific system message set may be added, deleted or re-grouped according to the requirements. For example, one system message in the specific system message set may be grouped into the basis system message set according to the requirements.

The system message transmission method is applicable to various types of communication systems.

How to group system messages in a Long Term Evolution (LTE) system into the basic system message set and the specific system message set is described hereinafter.

Brief description of contents and transmission characteristic of the system messages in the LTE system is provided firstly below.

MIB is used for a system access procedure. Several parameters of system messages relatively important are transmitted in the MIB. For example, a downlink bandwidth of a cell, configuration parameters of a Physical Hybrid ARQ Indicator Channel (PHICH), a System Frame Numbers (SFN) are sent through a Physical Broadcast Channel (PBCH), a transmission period of the MIB is 40 ms, i.e., transmitted from a wireless frame and transmitted four times, wherein a SFN of the wireless frame mod 4 equal 0. In a time domain, a transmission block carrying the MIB is sent in first four Orthogonal Frequency Division Multiplexing (OFDM) symbols in a second time slot of a subframe 0 of each wireless frame having a duration of 10 ms. In a frequency domain, the MIB occupies 1.08 MHz in a frequency band (72 subcarriers including a guard band).

SIB1 is used for broadcasting parameters related to a cell access procedure and a cell selection procedure and schedule information of SI messages (including one or more of SIB2 to SIB13 messages). A period of the SIB1 is 80 ms, and first transmission of the SIB1 is in a subframe 5 in a first wireless frame, wherein a SFN of the first wireless frame mod 8 equals 0 (SFN mod 8=0), and re-transmission of the SIB1 is in a subframe 5 in a second wireless frame in the period of 80 ms, wherein a SFN of the second wireless frame mod 2 equal to 0 (SFN mod 2=0).

Other system messages SI need to be scheduled in the SIB1.

SIB2 is used for configuration of wireless parameters commonly used by all UEs in a cell, and basic configuration of other wireless parameters.

SIB3 includes cell re-selection information, mainly about re-selection parameters of a serving cell and re-selection parameters of intra-frequency cells.

SIB4 includes a list of neighboring intra-frequency cells, and re-selection parameters of each of the neighboring cells, and a white list/black list of intra-frequency cells.

SIB5 includes a list of neighboring inter-frequency frequency points, and re-selection parameters of each of the frequency points, a list of neighboring inter-frequency cells, re-selection parameters of each of the neighboring cells, a black list of inter-frequency cells.

SIB6 includes a list of adjacent-frequency frequency points in a UTRA (Universal Terrestrial Radio Access) FDD (Frequency Division Duplex), re-selection parameters of each of the frequency points, a list of adjacent-frequency frequency points in a UTRA TDD (Time Division Duplex), and re-selection parameters of each of the frequency points.

SIB7 includes a list of adjacent-frequency frequency points in GERAN (a GSM/EDGE wireless access network) and re-selection parameters of each of the frequency points.

SIB8 includes pre-registration information of CDMA 2000, a list of adjacent-frequency frequency bands of the CDMA 2000, and re-selection parameters of each of the frequency bands, a list of neighboring cells of the adjacent-frequency frequency bands of the CDMA 2000.

SIB9 includes a name of Home eNodeB (a home base station).

SIB10 includes a primary notification of an Earthquake & Tsunami Warning System (ETWS).

SIB11 includes a secondary notification of the ETWS.

SIB12 includes a notification of a Commercial Mobile Alert System (CMAS).

SIB13 is used for acquiring control information about MBMS (Multimedia Broadcast Multicast Service) related to one or more MBSFN (Multicast-broadcast single-frequency network) regions.

SIB14 to SIB20 have respective characteristics and detailed descriptions thereof are not provided one by one.

In the present disclosure, contents of system messages in the basic system message set may include a part or all of parameters in the MIB and the SIB1 to the SIB8 in the LTE system, such as the downlink bandwidth, the SFN, configuration of the TDD. Contents of system messages in the specific system message station may include a part or all of parameters in the SIB9 to the SIB20 in the LTE system.

In the present disclosure, the network side device may determine a transmission mode of each of the system messages in the specific system message set in the following ways.

A first way is that the transmission mode of each of the system messages in the specific system message set is determined according to pre-configured system message transmission modes.

That is, the network side device may configure a transmission mode for each of the system messages in the specific system message set in advance.

Pre-configuring system message transmission modes may be specifically performed in various manners.

For example, it may be agreed that the dedicated signaling transmission mode based on requirements is used for transmission of each of the system messages in the specific system message set. A transmission mode may also be configured for each of the system messages in the specific system message set by referring to historical data. For example, in the historical data, in case that a quantity of UEs interested in a specific system message exceeds a pre-determined threshold, the transmission mode for the system message may be configured as the broadcast transmission mode, and in case that the quantity of UEs interested in the specific system message does not exceed the pre-determined threshold, the transmission mode for the system message may be configured as the dedicated signaling transmission mode.

The first way is relatively easy to be implemented and is applicable to an initial phase of the system message transmission method according to the present disclosure.

A second way is that the transmission mode of each of the system messages in the specific system message set is determined according to auxiliary information reported by the UEs.

Specifically, the network side device receives the auxiliary information reported by the UE. The auxiliary information includes identifiers of system messages being interested in by the UE or identifiers of system messages not being interested in by the UE in the specific system message set.

The network side device may determine a transmission mode of each of the system messages in the specific system message set according to the auxiliary information. Specifically, cases as follow are provided.

1) in case that a current transmission mode of a system message in the specific system message set is the broadcast transmission mode and the quantity of UEs reporting themselves to be interested in the system message within a predetermined time duration is below a pre-determined threshold, the transmission mode of the system message is changed to the dedicated signaling transmission mode; or 2) in case that a current transmission mode of a system message in the specific system message set is the broadcast transmission mode and the quantity of UEs reporting themselves to be interested in the system message within a predetermined time duration equals or is higher than the pre-determined threshold, the transmission mode of the system message is maintained as the broadcast transmission mode; or 3) in case that a current transmission mode of a system message in the specific system message set is the dedicated signaling transmission mode and the quantity of UEs reporting themselves to be interested in the system message within a predetermined time duration is below a pre-determined threshold, the transmission mode of the system message is maintained as the dedicated signaling transmission mode; or 4) in case that a current transmission mode of a system message in the specific system message set is the dedicated signaling transmission mode and the quantity of UEs reporting themselves to be interested in the system message within the predetermined time duration equals or is higher than the pre-determined threshold, the transmission mode of the system message is changed to the broadcast transmission mode.

In the above cases 1) and 2), UEs receiving the system message in the specific system message set transmitted through the broadcast transmission mode are required to report the identifier of the system message in the specific system message set received by the UE, so that the network side device determines the quantity of UEs interested in the system message in the system.

In the above 3) and 4), the network side device determines the quantity of UEs interested in the system message according to requests from the UEs.

The second way may more closely satisfy requirements of users, reflect the requirements of the users in real time, satisfy a principle of reducing overhead of transmission resources for system messages, and is generally used in a case that the system message transmission method provided in some embodiments of the present disclosure has been performed for a while.

In the present disclosure, after the network side device determines the transmission mode of each of the system messages in the specific system message set, the network side device also needs to send, to the UEs, a serial number or an identifier of a system message in the specific system message set to be transmitted using the broadcast transmission mode and/or the dedicated signaling transmission mode.

In the present disclosure, the network side device may send, to the UEs through ways as follow, the serial number or the identifier of the system message in the specific system message set to be transmitted using the broadcast transmission mode and/or the dedicated signaling transmission mode.

A first way: a system message in the basic system message set is used by the network side device to carry an indication of the transmission mode of the system message in the specific system message set.

A second way: a broadcast message newly introduced is used by the network side device to carry the indication of the transmission mode of the system message in the specific system message set.

A quantity of the broadcast message newly introduced may be one or more.

A third way: a dedicated signaling is used by the network side device to carry the indication of the transmission mode of the system message in the specific system message set. The dedicated signaling may be a Radio Resource Control (RRC) signaling, a Medium Access Control (MAC) signaling, or a physical-layer signaling.

In the first way, in order to ensure consistent understanding to transmission modes of the system messages in the specific system message set between the UEs and the network side device, a system message modification period may be introduced.

Specifically, in case that a transmission mode of any of the system messages in the specific system message set is changed, the network side device informs the UEs in a current basic system message modification period that the transmission mode of the system message in the specific system message set is to be changed, and/or informs the UEs of the identifier of the system message in the current basic system message modification period, the transmission mode of which is to be changed. In a basic system message modification period following the current basic system message modification period, the network side device transmits the system message through the changed transmission mode of the system message.

Similarly, in the second way, a message modification period also needs to be provided to the newly introduced broadcast message, in order to ensure consistent understanding to the transmission modes of the system messages in the specific system message set between the UEs and the network side device.

Specifically, in case that the transmission mode of any of the system messages in the specific system message set is changed, the network side device informs the UEs in a current broadcast message modification period that the transmission mode of the system message in the specific system message set is to be changed, and/or informs the UEs of the identifier of the system message, the transmission mode of which is to be changed. In a broadcast message modification period following the current broadcast message modification period, the network side device transmits the system message through the changed transmission mode of the system message.

In the above embodiments of the present disclosure, a broadcast process used for the system messages in the basic system message set and a broadcast process used for the system messages in the specific system message set may be the same, or may be independent processes. Specifically, physical resources and specific transmission mechanisms used for the system messages in the basic system message set and physical resources and specific transmission mechanisms used for the system messages in the specific system message set (such as re-transmission times and a schedule manner) may be the same or different. The physical resource may be at fixed position, or may be dynamic or semi-static physical resources. In case of dynamic or semi-static physical resources, a UE acquires contents of the system messages by a blind detection manner.

The above two ways for determining a transmission mode of a system message are illustrated hereinafter in conjunction with specific examples.

Figure 3:
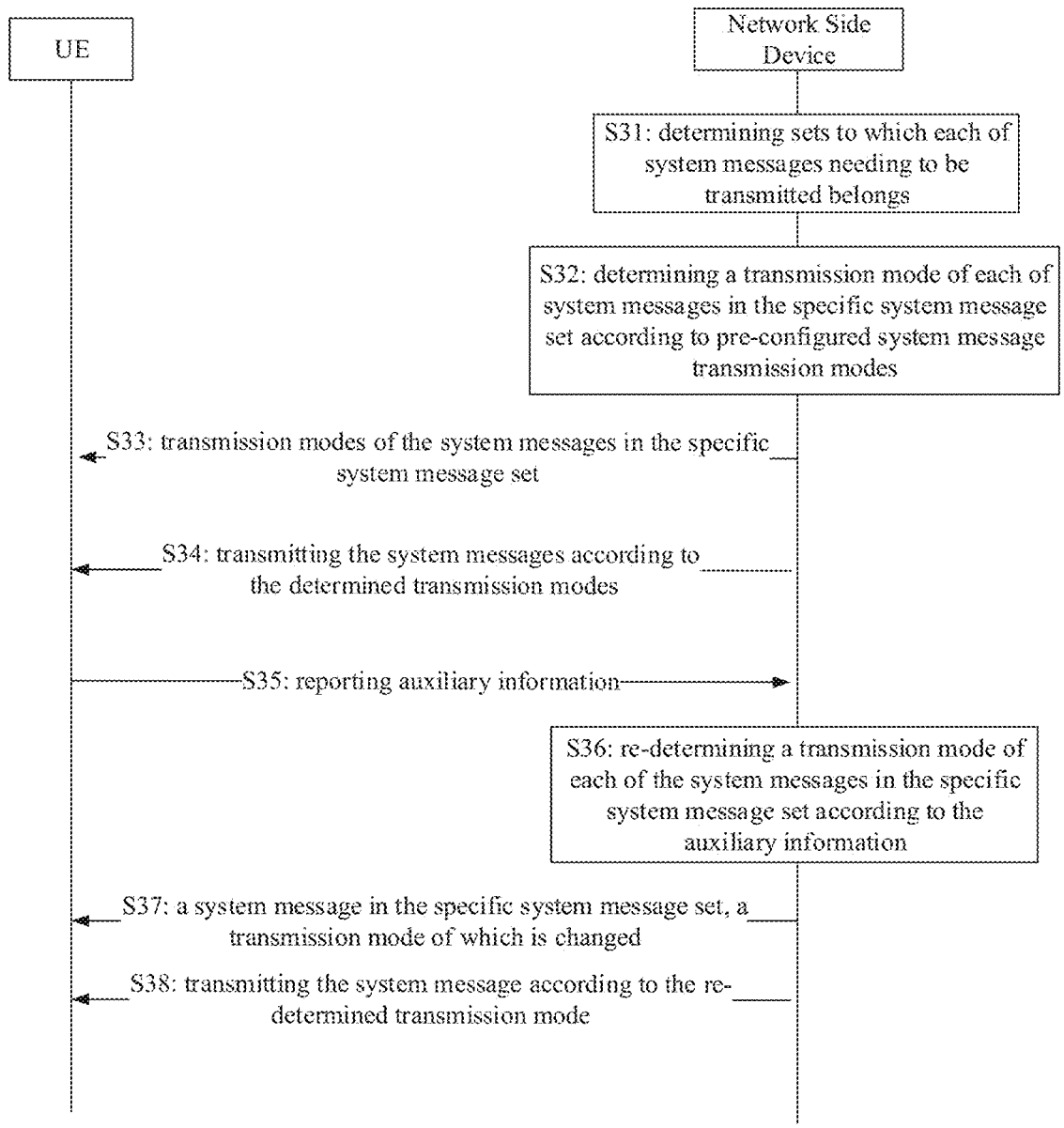
FIG. 3 is a flowchart of a system message transmission method according to some embodiments of the present disclosure.

Referring to FIG. 3, FIG. 3 is a flowchart of a system message transmission method according to some embodiments of the present disclosure. The system information transmission method includes steps S31-S38.

Step S31: determining, by a network side device, sets to which each of a plurality of system messages needing to be transmitted belongs, wherein the sets include a basic system message set and a specific system message set.

Step S32: determining, by the network side device, a transmission mode of each of the system messages in the specific system message set according to pre-configured system message transmission modes.

Step S33: sending, by the network side device, a serial number or an identifier of a system message in the specific system message set to be transmitted using the broadcast transmission mode and/or the dedicated signaling transmission mode.

Step S34: transmitting the system messages by the network side device according to the determined transmission modes.

Step S35: receiving, by the network side device, auxiliary information reported by the UEs, wherein the auxiliary information includes identifiers of system messages which the UEs are interested in or identifiers of system messages which the UEs are not interested in the specific system message set.

Step S36: re-determining, by the network side device, a transmission mode of each of the system messages in the specific system message set according to the auxiliary information. Specifically, cases as follow are provided.

1) in case that a current transmission mode of a system message in the specific system message set is the broadcast transmission mode and the quantity of UEs reporting themselves to be interested in the system message within a predetermined time duration is below a pre-determined threshold, the transmission mode of the system message is changed to the dedicated signaling transmission mode; or 2) in case that a current transmission mode of a system message in the specific system message set is the broadcast transmission mode and the quantity of UEs reporting themselves to be interested in the system message within the predetermined time duration equals or is higher than the pre-determined threshold, the transmission mode of the system message is maintained as the broadcast transmission mode; or 3) in case that a current transmission mode of a system message in the specific system message set is the dedicated signaling transmission mode and the quantity of UEs reporting themselves to be interested in the system message within a predetermined time duration is below a pre-determined threshold, the transmission mode of the system message is maintained as the dedicated signaling transmission mode; or 4) in case that a current transmission mode of a system message in the specific system message set is the dedicated signaling transmission mode and the quantity of UEs reporting themselves to be interested in the system message within the predetermined time duration equals or is higher than the pre-determined threshold, the transmission mode of the system message is changed to the broadcast transmission mode.

Step S37: sending, by the network side device to the UEs, a serial number or an identifier of a system message in the specific system message set, the transmission mode of which is changed.

Step S38: transmitting the system message by the network side device according to the re-determined transmission mode.

In the embodiments, the two ways for determining a transmission mode of a system message are used concurrently. In an initial operation stage of the system, the first way is used (i.e., the transmission mode is pre-configured) to determine the transmission mode of each of the system message in the specific system message set. After the system operates for a while, the transmission mode of each of the system message in the specific system message set is determined using the second way according to the auxiliary information reported by the UEs. A combination of the two ways satisfies actual conditions more closely.

In the above embodiments, when the network side device transmits the system messages, both the system messages in the basic system message set and the system messages in the specific system message may be transmitted in two manners as follow.

1) contents of the system message are directly transmitted; and 2) possible configuration of the system message is pre-configured in the UEs and numbered, only a serial number of the system message is carried when transmitting the system message.

The latter may further save system resources and reduce system overhead.

At the same time, before the network side device transmits a system message, the network side device may firstly determine whether a UE is configured with contents of the system message and a serial number or an identifier of the system message. In case that the UE is configured with the contents of the system message and the serial number of the system message, the network side device only transmits the identifier or the serial number of the system message. In case that the UE is not configured with the contents of the system message or the serial number or the identifier of the system message, the network side device transmits the contents of the system message.

Figure 4:
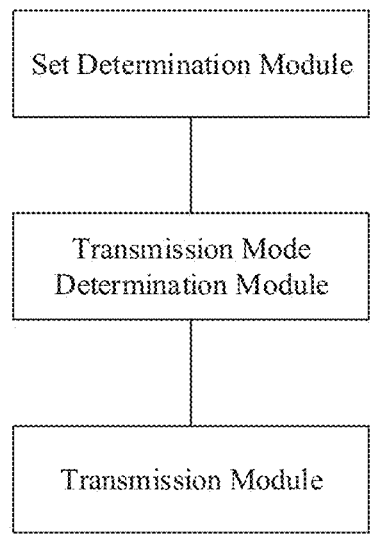
FIG. 4 is a structural block diagram of a system message transmission device according to some embodiments of the present disclosure.

Referring to FIG. 4, some embodiments of the present disclosure further provide a system message transmission device. The device includes: a set determination module, a transmission mode determination mode, and a transmission module.

The set determination module is configured to determine sets to which each of a plurality of system messages needing to be transmitted belongs, wherein the sets include a basic system message set and a specific system message set.

The transmission mode determination mode is configured to determine a transmission mode of each of the system messages in the specific system message set, wherein the transmission mode of all system messages in the basic system message set is the broadcast transmission mode, and the transmission mode of all system messages in the specific system message set is at least one of: a broadcast transmission mode, or a demand-based dedicated signaling transmission mode.

The transmission module configured to transmit the system messages through the determined transmission modes.

The transmission module may include a determination submodule. The determination submodule is configured to determine whether the request sent by the UE for requesting the system message in the specific system message set is received, and in case that the request is received, transmit, using the dedicated signaling transmission mode, the system message requested by the UE.

In order to group system messages into the basic system message set and the specific system message set, the system message transmission device may further include a grouping module. The grouping module is configured to group the system messages needing to be sent, into the basic system message set and the specific system message set, wherein contents of system messages in the basic system message set include parameters necessary to be acquired by a UE when the UE accesses the system and/or parameters necessary to be acquired by a UE in an idle state when the UE in the idle state performs a cell selection/re-selection procedure, and system messages in the specific system message set may include any one or a combination of a system message related to capability of a UE, a system message related to traffic characteristic of a UE, or a system message related to mobility of a UE.

In case that the system is a LTE system, optionally, contents of system messages in the basic system message set may include a part or all of parameters in the MIB and the SIB1 to the SIB8 in the LTE system; contents of system messages in the specific system message station may include a part or all of parameters in the SIB9 to the SIB20 in the LTE system.

The system message transmission device may determine a transmission mode of each of the system messages in the specific system message set in the following two ways. That is, the transmission mode determination module includes a first determination submodule and/or a second determination submodule.

The first determination submodule is configured to determine the transmission mode of each of the system messages in the specific system message set according to pre-configured system message transmission modes. The second determination submodule is configured to determine the transmission mode of each of the system messages in the specific system message set according to auxiliary information reported by the UEs.

Specifically, the second determination submodule may include a reception unit and a determination unit.

The reception unit is configured to receive the auxiliary information reported by the UE, wherein the auxiliary information includes identifiers of system messages being interested in by the UE or identifiers of system messages not being interested in by the UE in the specific system message set.

The determination unit is configured to determine a transmission mode of each of the system messages in the specific system message set according to the auxiliary information. Specifically, the following cases are provided.

In case that a current transmission mode of a system message in the specific system message set is the broadcast transmission mode and a quantity of UEs reporting themselves to be interested in the system message within a predetermined time duration is below a pre-determined threshold, the transmission mode of the system message is changed to the dedicated signaling transmission mode; or in case that the current transmission mode of the system message in the specific system message set is the broadcast transmission mode and the quantity of UEs reporting themselves to be interested in the system message within the predetermined time duration equals or is higher than the pre-determined threshold, the transmission mode of the system message is maintained as the broadcast transmission mode; or in case that the current transmission mode of the system message in the specific system message set is the dedicated signaling transmission mode and the quantity of UEs reporting themselves to be interested in the system message within a predetermined time duration is below a pre-determined threshold, the transmission mode of the system message is maintained as the dedicated signaling transmission mode; or in case that the current transmission mode of the system message in the specific system message set is the dedicated signaling transmission mode and the quantity of UEs reporting themselves to be interested in the system message within the predetermined time duration equals or is higher than the pre-determined threshold, the transmission mode of the system message is changed to the broadcast transmission mode.

In order to inform a transmission mode of a system message in the specific system message set to UEs, the system message transmission device further includes a notification module. The notification module is configured to send, to the UEs, a serial number or an identifier of a system message in the specific system message set to be transmitted using the broadcast transmission mode and/or the dedicated signaling transmission mode.

Optionally, the notification module may send the transmission mode of the system message in the specific system message set to the UEs in two manners. Specifically, the notification module includes a first notification unit or a second notification unit.

The first notification unit is configured to cause an indication of a transmission mode of a system message in the specific system message set to be carried in a system message in the basic system message set.

The second notification unit is configured to cause the indication of the transmission mode of the system message in the specific system message set to be carried in a broadcast message newly introduced or a dedicated signaling newly introduced.

In order to ensure consistent understanding to transmission modes of the system messages in the specific system message set between the UEs and the network side device, a system message modification period may be introduced.

Specifically, the first notification unit is specifically configured to, in case that a transmission mode of any of the system messages in the specific system message set is changed, notify the UEs in a current basic system message modification period that the transmission mode of the system message in the specific system message set is to be changed, and/or notify the UEs of the identifier of the system message in the current basic system message modification period, wherein the transmission mode of the system message is to be changed; and in a basic system message modification period following the current basic system message modification period, transmit the system message through the changed transmission mode of the system message.

Similarly, in the second manner, a broadcast message modification period also needs to be provided to the newly introduced broadcast message, in order to ensure consistent understanding to transmission modes of the system messages in the specific system message set between the UEs and the network side device.

Specifically, the second notification unit is configured to, in case that the transmission mode of any of the system messages in the specific system message set is changed, notify the UEs in a current broadcast message modification period that the transmission mode of the system message in the specific system message set is to be changed, and/or notify the UEs of the identifier of the system message in the current broadcast message modification period, wherein the transmission mode of the system message is to be changed; and in a broadcast message modification period following the current broadcast message modification period, transmit the system message through the changed transmission mode of the system message.

In the above embodiments of the present disclosure, a broadcast process used for the system messages in the basic system message set and a broadcast process used for the system messages in the specific system message set may be the same, or may be independent processes.

In the above embodiments, the system message transmitted by the network side device may be contents of the system message; or an identifier or a serial number of the system message.

Optionally, the transmission module includes a determination sub-module. The determination sub-module is configured to determine whether a UE is configured with contents of a system message and a serial number of the system message. If the UE is configured with the contents of the system message and a serial number or an identifier of the system message, the network side device only transmits the identifier or the serial number of the system message; if the UE is not configured with the contents of the system message or the identifier or the serial number of the system message, the network side device transmits the contents of the system message.

Figure 5:
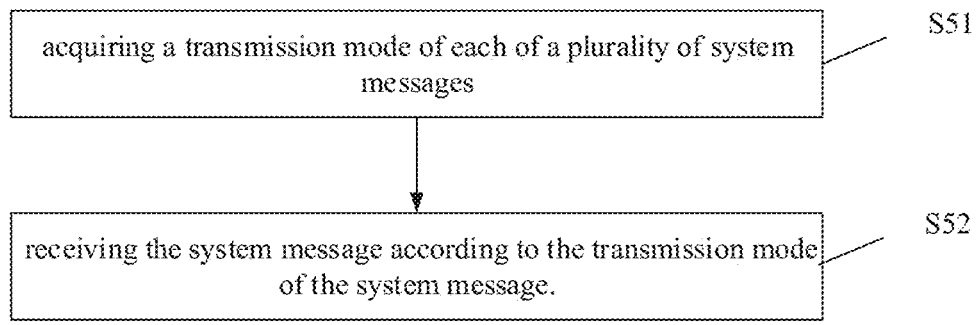
FIG. 5 is a flowchart of a system message reception method according to some embodiments of the present disclosure.

Referring to FIG. 5, some embodiments of the present disclosure further provide a system message reception method. The method includes steps S51-S52.

Step S51: acquiring, by a User Equipment (UE), a transmission mode of each of a plurality of system messages, wherein the transmission mode of all system messages in the basic system message set is a broadcast transmission mode, and the transmission mode of all system messages in a specific system message set is at least one of: a broadcast transmission mode, or a demand-based dedicated signaling transmission mode.

Step S52: receiving the system message by the UE according to the transmission mode of the system message.

If the UE is in the idle state, the UE only receives the system messages in the basic system message set.

If the UE is in the connected state, the receiving the system message by the UE according to the transmission mode of the system message, includes: receiving, by the UE through the broadcast transmission mode, the system message in the basic system message set transmitted by the network side device; in case that the transmission mode of the system message in the specific system message set is the broadcast transmission mode, receiving the system message by the UE through the broadcast transmission mode; in case that the transmission mode of the system message in the specific system message set is the dedicated signaling transmission mode and the UE is interested in the system message, requesting the system message to the network side device by the UE. The dedicated signaling used for requesting the system message may be a Radio Resource Control (RRC) signaling, a Medium Access Control (MAC) signaling, or a physical-layer signaling.

In the above embodiments, when the UE receives, through the broadcast transmission mode, the system message transmitted by the network side device, the UE determines used resources according to a design of a physical layer of the UE, wherein when the physical layer is designed to use static resources, the UE receives the system message using the static resources; when the physical layer is designed to use dynamic or semi-static physical resources, the UE acquires the system message through a blind detection procedure.

In the above embodiments, before acquiring, by the UE, the transmission mode of each of the system messages, the method includes: receiving, by the UE, an indication of the transmission mode of the system message in the specific system message set sent from the network side device.

In case that a system message in the basic system message set is used by the network side device to carry the indication of the transmission mode of the system message in the specific system message set, the receiving, by the UE, the indication of the transmission mode of the system message in the specific system message set sent from the network side device, includes: receiving the system message in the basic system message set through the broadcast transmission mode, and acquiring the transmission mode of the system message in the specific system message set from the indication carried in the system message in the basic system message set.

Figure 6:
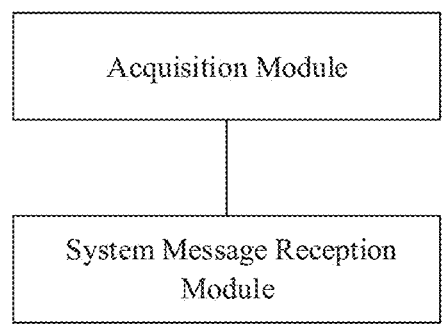
FIG. 6 is a structural block diagram of a system message reception device according to some embodiments of the present disclosure.

Referring to FIG. 6, some embodiments of the present disclosure further provide a system message reception device. The device includes an acquisition module and a system message reception module.

The acquisition module is configured to acquire a transmission mode of each of a plurality of system messages, wherein the transmission mode of all system messages in the basic system message set is the broadcast transmission module, and the transmission mode of all system messages in the specific system message set is at least one of: the broadcast transmission mode, or a demand-based dedicated signaling transmission mode.

The system message reception module is configured to receive the system message by the UE according to the transmission mode of the system message.

If the UE is in the idle state, the system message reception module is configured to only receive the system messages in the basic system message set.

If the UE is in the connected state, the system message reception module includes a first reception submodule, a second reception submodule, and a third reception submodule.

The first reception submodule is configured to receive, through the broadcast transmission mode, the system messages in the basic system message set transmitted by the network side device.

The second reception submodule is configured to, in case that the transmission mode of the system message in the specific system message set is the broadcast transmission mode, receive the system message through the broadcast transmission mode.

The third reception submodule is configured to, in case that the transmission mode of the system message in the specific system message set is the dedicated signaling transmission mode and the UE is interested in the system message, request the system message from the network side device.

The system message reception module is specifically configured to, in case that the UE receives the system message from the network side device through the broadcast mode, determine used resources according to a design of a physical layer of the UE, wherein when the physical layer is designed to use static resources, the system message reception module receives the system message using the static resources; when the physical layer is designed to use dynamic or semi-static physical resources, the system message reception module acquires the system message through a blind detection procedure.

In order to acquire a transmission mode of a system message in the specific system message set, the system message reception device further includes a transmission mode reception module. The transmission mode reception module is configured to receive an indication of a transmission mode of a system message in the specific system message set sent from the network side device.

In case that a system message in the basic system message set is used by the network side device to carry the indication of the transmission mode of the system message in the specific system message set, the transmission mode reception module is configured to receive the system message in the basic system message set through the broadcast transmission mode, and acquire the transmission mode of the system message in the specific system message set from the indication carried in the system message in the basic system message set.

Figure 7:
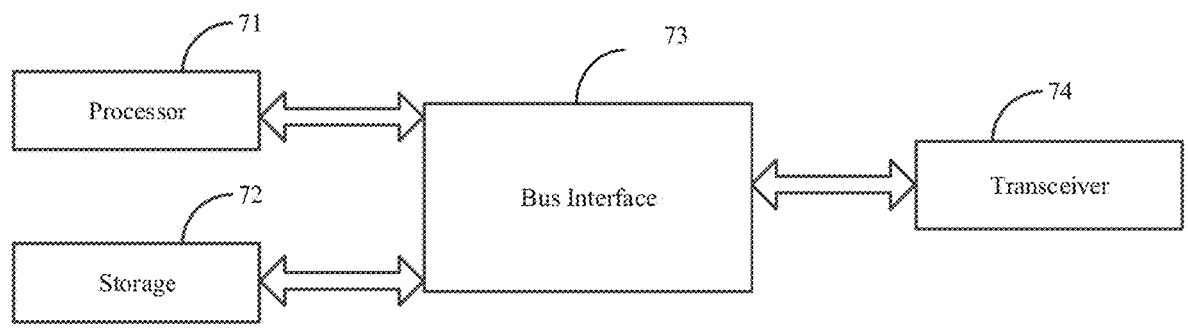
FIG. 7 is a structural block diagram of a base station according to some embodiments of the present disclosure.

Referring to FIG. 7, some embodiments of the present disclosure further provide a base station. The base station includes a processor 71, a storage 72, a bus interface and a transceiver 74.

The processor 72 is connected to the storage 72 through the bus interface 73, and is configured to read programs in the storage 72 to perform the following steps: determining sets to which each of a plurality of system messages needing to be transmitted belongs, wherein the sets include a basic system message set and a specific system message set; determining a transmission mode of the each of the system messages, wherein the transmission mode of all system messages in the basic system message set is the broadcast transmission mode, and the transmission mode of all system messages in the specific system message set includes at least one of: the broadcast transmission mode, or the demand-based dedicated signaling transmission mode; transmitting the system messages through the determined transmission modes by means of the transceiver 74.

The transceiver 71 is connected to the processor 71 through the bus interface, and is configured to transmit data and receive data under a control of the processor 71.

In FIG. 7, the bus interface may include any number of buses and bridges connected together. Specifically, circuits including a plurality of processors such as the processor 71 and a plurality of storages such as the storage 72 are connected together by the bus interface. The bus interface may also cause any other circuits such as a peripheral circuit, a voltage regulator and a power management circuit to be connected together. The circuits are known in the art, and thus detailed descriptions thereof are not further provided herein. The bus interface provides an interface. The transceiver 74 may include a plurality of elements such as receivers, transmitters, and units for communicating with other devices through a transmission medium. The processor 71 takes charge of the bus interface and general processing. The storage 72 may store data used by the processor 71 when the processor 71 performs operations.

The processor 71 takes charge of the bus interface and general processing. The storage 72 may store computer readable instructions executable by the processor 71 and data used by the processor 71 when the processor 71 performs operations. When the computer readable instructions stored in the storage 72 are executed by the processor 71, the processor 71 performs the following operations: determining sets to which each of a plurality of system messages needing to be transmitted belongs, wherein the sets include a basic system message set and a specific system message set; determining the transmission mode of the each of the system messages, wherein the transmission mode of all system messages in the basic system message set is a broadcast transmission mode, and the transmission mode of all system messages in the specific system message set includes at least one of: a broadcast transmission mode, or a demand-based dedicated signaling transmission mode; and transmitting the system messages through the determined transmission modes.

Figure 8:
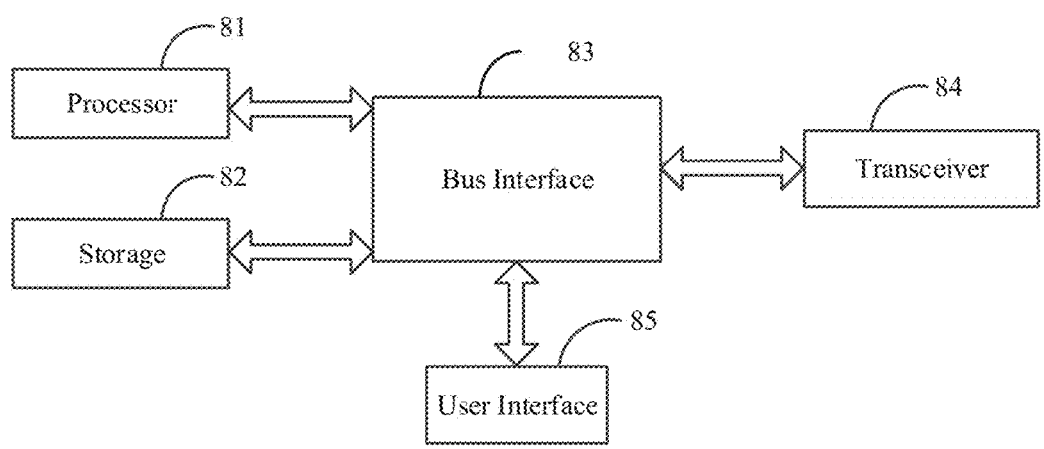
FIG. 8 is a structural block diagram of a user equipment according to some embodiments of the present disclosure.

Referring to FIG. 8, some embodiments of the present disclosure further provide a UE. The UE includes a processor 81, a storage 82, a bus interface 83, a transceiver 85, and a user interface 85.

The processor 82 is connected to the storage 82 through the bus interface 83 and is configured to read programs in the storage 82 to perform the following steps: acquiring a transmission mode of each of a plurality of system messages, wherein the transmission mode of all system messages in the basic system message set is the broadcast transmission mode, and the transmission mode of all system messages in the specific system message set is at least one of: the broadcast transmission mode, or the demand-based dedicated signaling transmission mode; receiving the system message by the UE according to the transmission mode of the system message through the transceiver 84.

The transceiver 84 is connected to the processor 81 through the bus interface 83 and is configured to transmit data and receive data under a control of the processor 81.

In FIG. 8, the bus interface may include any number of buses and bridges connected together. Specifically, circuits including a plurality of processors such as the processor 81 and a plurality of storages such as the storage 82 are connected together by the bus interface. The bus interface may also cause any other circuits such as a peripheral circuit, a voltage regulator and a power management circuit to be connected together. The circuits are known in the art, and thus detailed descriptions thereof are not further provided herein. The bus interface provides an interface. The transceiver 84 may include a plurality of elements such as receivers, transmitters, and units for communicating with other devices through a transmission medium. Directed to different user equipments, the user interface 85 may also be an interface capable of being connected to external devices including, but not limited to, keypads, displays, speakers, microphones, joysticks, or the like.

The processor 81 takes charge of the bus interface and general processing. The storage 82 may store computer readable instructions executable by the processor 81 and data used by the processor 71 when the processor 71 performs operations. When computer readable instructions stored in the storage 82 are executed by the processor 81, the processor 81 performs the following operations: acquiring a transmission mode of each of a plurality of system messages, wherein the transmission mode of all system messages in the basic system message set is the broadcast transmission mode, and the transmission mode of all system messages in the specific system message set is at least one of: the broadcast transmission mode, or the demand-based dedicated signaling transmission mode; and receiving the system message according to the transmission mode of the system message.

The embodiments of the present disclosure may be implemented in hardware, specific circuits, software, a logic, or any combination thereof. Some aspects of the embodiments of the present disclosure may be implemented in hardware, and other aspects of the embodiments of the present disclosure may be implemented by firmware or software executable by a controller, a microprocessor or other computing devices. When aspects of the embodiments of the present disclosure are illustrated or described as blocks, flowcharts or represented by other figures, it should be understood that blocks, apparatus, systems, techniques or methods described herein may be implemented as non-limiting examples in hardware, software, firmware, specific circuits or logics, general hardware or controllers or other computing devices, or some combinations thereof.

As an example, the embodiments of the present disclosure may be described in a context of computer readable instructions, the computer readable instructions are included in program modules executable in devices such as real or virtual processors. Generally, program modules include routines, programs, libraries, objects, classes, components, data structures, or the like, which execute specific tasks or implements specific abstract data structures. In the embodiments, functions of the program modules may be combined or split among the described program modules. The computer readable instructions included in the program modules may be executed locally or in distributed devices. In the distributed devices, the program modules may be local or in a remote storage medium.

The modules mentioned in the embodiments of the present disclosure may be implemented by software, or may be implemented by hardware, or may be implemented by a combination of hardware or software. The modules described herein may be arranged in a processor, such as, a processor may include the set determination module and the transmission mode determination module, wherein names of the modules do not form limitations of the modules in certain circumstances.

As another aspect, the present disclosure further provides a non-volatile computer storage medium. The non-volatile computer storage medium may be a non-volatile computer storage medium included in the above devices, or may be a separate non-volatile computer storage medium not assembled into the UE. The non-volatile computer storage medium stores one or more programs. When the one or more programs are executed by a device, the device executes the system message transmission method or the system message reception method according to the embodiments of the present disclosure.

The above are only alternative embodiments of the present disclosure. It should be pointed out that numerous modifications and embellishments can be done by one skilled in the art without departing the spirit of the present disclosure. Such modifications and embellishments should also be considered to be within the protection scope of the present disclosure.

What is claimed is:
1. A system message transmission method, comprising:
determining, by a network side device, sets to which each of a plurality of system messages needing to be transmitted belongs, wherein the sets comprise a basic system message set and a specific system message set;
determining, by the network side device, a transmission mode of the each of the plurality of system messages, wherein the transmission mode of all system messages in the basic system message set is a broadcast transmission mode, and the transmission mode of all system messages in the specific system message set comprises at least one of: a broadcast transmission mode, or a demand-based dedicated signaling transmission mode; and
transmitting the system messages by the network side device according to the determined transmission modes;
wherein after the determining, by the network side device, the transmission mode of each of the system messages in the specific system message set, the method further comprises:
sending a system message in the basic system message set by the network side device, the system message in the basic system message set carrying an indication of the transmission mode of the system message in the specific system message set.

2. The method according to claim 1, wherein the transmitting the system messages by the network side device according to the determined transmission mode, comprises:
determining, by the network side device, whether a request sent by a User Equipment (UE) for requesting the system message in the specific system message set is received or not;
in case that the request is received, transmitting, by the network side device to the UE using the dedicated signaling transmission mode, the system message requested by the UE.

3. The method according to claim 1, wherein before determining, by the network side device, the sets to which each of the plurality of system messages needing to be transmitted belongs, the method further comprises:
grouping, by the network side device, the plurality of system messages needing to be sent, into the basic system message set and the specific system message set, wherein contents of the system messages in the basic system message set comprise parameters necessary to be acquired by a User Equipment (UE) when the UE performs an access procedure and/or parameters necessary to be acquired by a UE in an idle state when the UE in the idle state performs a cell selection/reselection procedure; and the system messages in the specific system message set comprise any one or a combination of a system message related to capability of a UE, a system message related to traffic characteristic of a UE, or a system message related to mobility of a UE.

4. The method according to claim 3, wherein, contents of the system messages in the basic system message set comprise all or a part of parameters in a Master Information Block (MIB) and a System Information Block (SIB) 1 to a SIB 8 in a Long Term Evolution (LTE) system;
contents of the system messages in the specific system message set comprise all or a part of parameters in a SIB 9 to a SIB 20 in the LTE system.

5. The method according to claim 1, wherein the determining, by the network side device, the transmission mode of each of the plurality of system messages in the specific system message set, comprises:
determining, by the network side device, the transmission mode of each of the system messages in the specific system message set according to pre-configured system message transmission modes; or determining, by the network side device, the transmission mode of each of the system messages in the specific system message set according to auxiliary information reported by a User Equipment (UE).

6. The method according to claim 5, wherein,
the auxiliary information comprises identifiers of system messages being interested in by the UE or identifiers of system messages not being interested in by the UE in the specific system message set;
the determining, by the network side device, the transmission mode of each of the system messages in the specific system message set according to the auxiliary information reported by the UE, comprises:
in case that a current transmission mode of a system message in the specific system message set is the broadcast transmission mode and a quantity of UEs reporting to be interested in the system message within a predetermined time duration is below a pre-determined threshold, changing the transmission mode of the system message to the dedicated signaling transmission mode; or
in case that the current transmission mode of the system message in the specific system message set is the broadcast transmission mode and the quantity of UEs reporting to be interested in the system message within the predetermined time duration equals or is higher than the pre-determined threshold, maintaining the transmission mode of the system message as the broadcast transmission mode; or
in case that the current transmission mode of the system message in the specific system message set is the dedicated signaling transmission mode and the quantity of UEs reporting to be interested in the system message within a predetermined time duration is below a pre-determined threshold, maintaining the transmission mode of the system message as the dedicated signaling transmission mode; or
in case that the current transmission mode of the system message in the specific system message set is the dedicated signaling transmission mode and the quantity of UEs reporting to be interested in the system message within the predetermined time duration equals or is higher than the pre-determined threshold, changing the transmission mode of the system message to the broadcast transmission mode.

7. The method according to claim 1, wherein, sending the system message in the basic system message set by the network side device the system message in the basic system message carrying the indication of the transmission mode of the system message in the specific system message set, comprises:
in case that the transmission mode of any of the system messages in the specific system message set is changed, informing the UE in a current basic broadcast message modification period by the network side device that the transmission mode of the system message in the specific system message set is to be changed, and/or informing the UE of the identifier of the system message, the transmission mode of which is to changed; and
transmitting, by the network side device, the system message according to the changed transmission mode of the system message in a basic system message modification period following the current basic system message modification period.

8. The method according to claim 1, wherein the system message transmitted by the network side device comprises:

contents of the system message; or
an identifier or a serial number of the system message;
the transmitting the system messages by the network side device according to the determined transmission mode, comprises:
determining, by the network side device, whether a User Equipment (UE) is configured with the contents of the system message and the identifier or the serial number of the system message;
when the UE is configured with the contents of the system message and the identifier or the serial number of the system message, transmitting the identifier or the serial number of the system message when the network side device transmits the system message;
when the UE is not configured with the contents of the system message, transmitting the contents of the system message by the network side device.

9. A system message transmission device, comprising:
a processor, and
a transceiver connected with the processor and configured to transmit data and receive data under a control of the processor,
wherein the processor is configured to perform the method according to claim 1.

10. A system message reception method, comprising:
acquiring, by a User Equipment (UE), a transmission mode of each of a plurality of system messages, wherein the transmission mode of all system messages in a basic system message set is a broadcast transmission mode, and the transmission mode of all system messages in a specific system message set is at least one of: a broadcast transmission mode, or a demand-based dedicated signaling transmission mode; and
receiving the each of the plurality of system messages by the UE according to the transmission mode of the each of the plurality of system messages;
wherein, a system message in the basic system message set is used by the network side device to carry an indication of the transmission mode of a system message in the specific system message set,
before acquiring, by the UE, the transmission mode of each of the plurality of system messages, the method further comprises:
receiving the system message in the basic system message set by the UE through the broadcast transmission mode, and acquiring the transmission mode of the system message in the specific system message set from the indication carried in the system message in the basic system message set.

11. The method according to claim 10, wherein in case that the UE is in an idle state, receiving the each of the plurality of system messages by the UE according to the transmission mode of the each of the plurality of system messages, comprises:
receiving only the system messages in the basic system message set by the UE.

12. The method according to claim 10, wherein in case that the UE is in a connected state, receiving the each of the plurality of system messages by the UE according to the transmission mode of the each of the plurality of system messages, comprises:
receiving, by the UE through the broadcast transmission mode, system messages in the basic system message set transmitted by the network side device;
in case that a transmission mode of a system message in the specific system message set is the broadcast transmission mode, receiving the system message in the specific system message set through the broadcast transmission mode by the UE; and in case that the transmission mode of the system message in the specific system message set is the dedicated signaling transmission mode and the UE is interested in the system message, requesting the system message from the network side device by the UE.

13. The method according to claim 10, further comprising:

determining used resources according to a design of a physical layer of the UE when the UE receives the system message transmitted by a network side device through the broadcast transmission mode, wherein when the physical layer is designed to use static resources, the UE receives the system message using the static resources; when the physical layer is designed to use dynamic or semi-static physical resources, the UE acquires the system message through a blind detection procedure.

14. A system message reception device, comprising:

a processor, and a transceiver connected with the processor and configured to transmit data and receive data under a control of the processor, wherein the processor is configured to perform the method according to claim 10.

15. A system message reception device, comprising:

an acquisition circuit configured to acquire a transmission mode of each of a plurality of system messages, wherein the transmission mode of all system messages in a basic system message set is a broadcast transmission mode, and the transmission mode of all system messages in a specific system message set is at least one of: a broadcast transmission mode, or a demand-based dedicated signaling transmission mode; and a system message reception circuit configured to receive the each of the plurality of system messages by the UE according to the transmission mode of the each of the plurality of system messages;

wherein, a system message in the basic system message set is used by the network side device to carry an indication of the transmission mode of a system message in the specific system message set;

the system message reception device further comprises a transmission mode reception circuit, configured to receive the system message in the basic system message set through the broadcast transmission mode, and acquire the transmission mode of the system message in the specific system message set from the indication carried in the system message in the basic system message set.

* * * * *